(12) United States Patent
Varga

(10) Patent No.: US 8,490,807 B2
(45) Date of Patent: Jul. 23, 2013

(54) FUEL CONTAINER FOR MOTOR VEHICLES WITH A TIE ROD

(75) Inventor: Laszlo Varga, Sinabelkirchen (AT)

(73) Assignee: MAGNA STEYR Fuel Systems GesmbH, Sinabelkirchen (AT)

(*) Notice: Subject to any disclaimer, the term of this patent is extended or adjusted under 35 U.S.C. 154(b) by 0 days.

(21) Appl. No.: 13/389,463

(22) PCT Filed: Aug. 5, 2010

(86) PCT No.: PCT/EP2010/061437
§ 371 (c)(1),
(2), (4) Date: Feb. 8, 2012

(87) PCT Pub. No.: WO2011/018410
PCT Pub. Date: Feb. 17, 2011

(65) Prior Publication Data
US 2012/0138606 A1    Jun. 7, 2012

(30) Foreign Application Priority Data
Aug. 11, 2009  (DE) .................. 10 2009 036 911

(51) Int. Cl.
*B65D 6/34* (2006.01)
*B65D 6/28* (2006.01)

(52) U.S. Cl.
USPC ........................................ 220/4.14; 220/682

(58) Field of Classification Search
USPC .... 220/4.21, 4.12–4.17, 562–564, 4.12–4.14, 220/567.2, 592, 584, 652, 653, 905, 918, 220/920, 921, 682; 206/405, 54, 406
See application file for complete search history.

(56) References Cited

U.S. PATENT DOCUMENTS

| | | | | |
|---|---|---|---|---|
| 2,865,071 | A * | 12/1958 | Clemens ..................... | 242/388.1 |
| 4,200,249 | A * | 4/1980 | Synstelien et al. .......... | 242/396.5 |
| 5,954,091 | A * | 9/1999 | Leadford ...................... | 137/587 |
| 6,119,872 | A * | 9/2000 | Flores et al. .................... | 211/40 |
| 6,135,306 | A * | 10/2000 | Clayton et al. ................ | 220/564 |
| 6,338,420 | B1 * | 1/2002 | Pachciarz et al. ............. | 220/562 |
| 6,499,500 | B2 * | 12/2002 | Rosseel ...................... | 137/15.17 |
| 6,679,399 | B2 * | 1/2004 | Franjo et al. .................. | 220/562 |
| 6,857,534 | B1 * | 2/2005 | Keller .......................... | 220/4.13 |
| 7,121,405 | B2 * | 10/2006 | Ito et al. ...................... | 206/308.1 |
| 7,802,824 | B2 * | 9/2010 | Christensen et al. ......... | 285/399 |
| 7,922,949 | B2 * | 4/2011 | Borchert et al. .............. | 264/250 |
| 2010/0170031 | A1 * | 7/2010 | Shieh ................................ | 4/378 |
| 2012/0325822 | A1 * | 12/2012 | Pozgainer ..................... | 220/562 |
| 2013/0008908 | A1 * | 1/2013 | Hill et al. ...................... | 220/562 |

* cited by examiner

*Primary Examiner* — J. Gregory Pickett
*Assistant Examiner* — Mollie Llewellyn
(74) *Attorney, Agent, or Firm* — Jordan IP Law, LLC; Todd A. Vaughn

(57) ABSTRACT

A fuel container operating under overpressure and consisting of two shells is to be reinforced by means of an inner column so that, when the two shells are conjoined, a tension resistant connection is created. For this purpose, the column consists of a first and a second part connected to the respective shell, one part having catches, the other part having latching hooks, which catches and latching hooks for a tension resistant snap-in connection when joined together. For this purpose, both parts have latching surfaces and deflecting surfaces and the latching hook is resiliently displaceable.

20 Claims, 4 Drawing Sheets

FUEL CONTAINER FOR MOTOR VEHICLES WITH A TIE ROD

CROSS-REFERENCE TO RELATED APPLICATIONS

The present application is a National Stage Application of PCT International Application No. PCT/EP2010/061437 (filed on Aug. 5, 2010), under 35 U.S.C. §371, which claims priority to German Patent Application No 10 2009 036 911.2 (filed on Aug. 11, 2009), which are each hereby incorporated by reference in their respective entireties.

FIELD OF THE INVENTION

The invention relates to a fuel container which is subjected to overpressure, at least temporarily, and is formed of two shells which are interconnected around their periphery and inside the periphery by way of at least one column.

For operational reasons, it is appropriate to design fuel containers for a higher pressure level of up to 500 mBar. The increased internal pressure exerts considerable forces onto the inner face of the large-area shells, which leads to an outward curvature thereof. Such a distended container would exceed the predefined installation dimensions.

BACKGROUND OF THE INVENTION

WO 98/01315 discloses a fuel container that includes two plastics material shells. To maintain a precise distance between the two shells during welding thereof, the shells each have a spacer. The spacers form stops during the joining of the two shells. Because the spacers are not stops which are welded together, they cannot transfer any tensile forces, and therefore are not effective when overpressure prevails in the tank A fuel container that includes two plastics material shells is known from U.S. Pat. No. 6,338,420, of which the shells are braced by an internal column against curvature caused by an overpressure or vacuum. For this purpose, the column is either deformable in the longitudinal direction thereof, or includes two parts which can slide one inside the other in an abradant manner. It is not disclosed, and is also difficult to imagine, how the column or parts thereof are positioned during assembly, and thus, welded to the shells so that they can also take up significant tensile forces. In the two-part embodiment, practically no tensile forces are transferred and it is doubtful whether, and how, the two parts come to be arranged one inside the other when joining the two (non-transparent) shells.

SUMMARY OF THE INVENTION

An object of the invention is, therefore, to equip a two-shelled fuel container with a reinforcement which is effective under internal pressure, can be positioned precisely and, after conjoining of the two shells, creates between the two parts of the column a connection which can also take up considerable tensile forces in the direction of the longitudinal axis of the column.

In accordance with the invention, this is achieved by a fuel container which is subjected to overpressure, at least temporarily, and is formed of two shells, which shells are interconnected around their periphery and inside the periphery by way of at least one column.

In accordance with the invention, the column includes a first part and a second part which are connected to, or formed integrally with, their shells and can be interconnected when the two shells are conjoined.

In accordance with the invention, the first part of the column has a plurality of catches distributed over the periphery and a first latching surface, and the second part has a plurality of latching hooks distributed over the periphery and second latching surfaces, and both have an inclined deflecting surface.

In accordance with the invention, the first and second latching surfaces lie in a plane substantially normal to the axis of the column and the latching hooks are resiliently displaceable in this plane and, in their end position, engage around the catches so that the column can absorb tensile forces.

The two parts of the column can be joined, for example, via a weld technique, to the inner face of the respective shells in a positionally accurate manner, provided they are not actually formed in one piece therewith, before the joining of the two shells. The deflecting surfaces and latching surfaces, normal to the axis, of the catches and the resiliently displaceable latching hooks form a tension resistant snap-in connection when the two shells are arranged one on top of the other before welding. Since a plurality of catches and latching hooks are distributed over the periphery at a certain distance from the center axis of the column, the two parts are also placed easily one inside the other during the joining process.

If the shells are also to retain their shape under vacuum which may possibly occur, the latching hooks have stop surfaces which, once snapped into the catches, prevent the two parts from moving any closer to one another and from buckling under vacuum during operation.

In an advantageous development, one of the first part and the second part of the column has a central centering pin and one of the first part and the second part of the column has a central centering bore. This further facilitates the positioning one inside the other of the two parts of the column when joining the two shells, and allows greater deviations in dimension.

The parts of the columns preferably each have a base flange which can be interconnected, for example, via a weld technique, to the associated shell. Greater tensile forces can be introduced into the shells over the area of the base flange.

For resilient displacement of the latching hooks, either the latching hooks themselves are resiliently flexible or the second part of the column provided with the latching hooks is torsionally flexible so that the entire second part turns resiliently about the longitudinal axis of the column during the joining process.

In a particularly expedient embodiment, the second part of the column includes over its entire length a plurality of ribs which extend in the longitudinal direction, and which preferably transition directly into the latching hooks. In order to prevent a buckling of the ribs, the longitudinal ribs may be braced by connecting diaphragms.

DETAILED DESCRIPTION OF EMBODIMENTS

Figure 1:
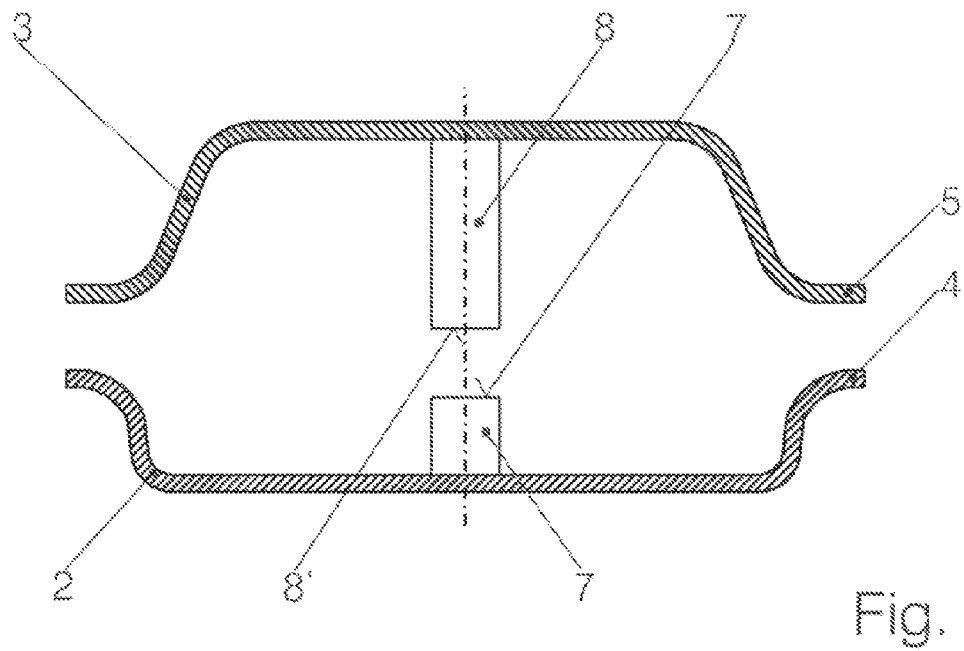
FIG. 1 illustrates a schematic vertical section through a fuel container in accordance with the invention, pre-assembly.
Figure 2:
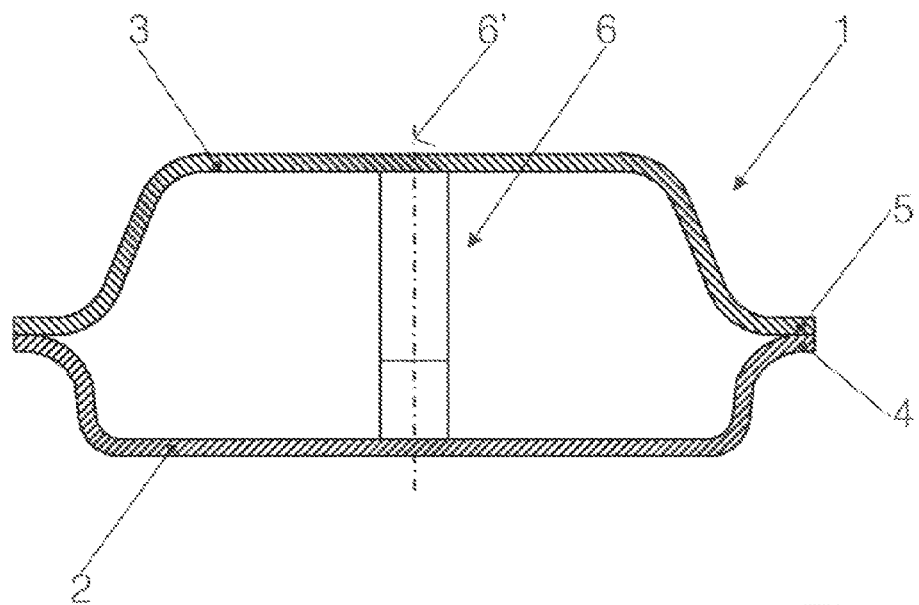
FIG. 2 illustrates a schematic vertical section through a fuel container in accordance with the invention, post-assembly.

As illustrated in FIGS. 1 and 2, a fuel container 1 is formed of a first shell 2 and a second shell 3. Each shell has a peripheral flange 4 and 5 respectively configured to permit connection of the shells 2, 3, for example, by a weld technique. In FIG. 1, the shells are illustrated before their connection, and in FIG. 2 they are shown after their connection. A column 6 having a longitudinal axis 6' is provided in the volume of the container 1 thus formed for reinforcement (a plurality of columns may also be provided). The purpose of the column is to prevent a bulging of the shells 2, 3 as a result of internal pressure within the volume defined by the connection of the shells 2, 3.

The column 6 includes a first column part 7 and a second column part 8 which, before the shells 2, 3 are joined, are connected together, via for example, a weld technique, to their respective shell provided they are not formed in one piece therewith. The end 7' of the firs column part 7 and the end 8' of the second column part 8, remote from their shell are still spatially distanced from one another in FIG. 1. As illustrated in FIG. 2, upon assembly, the first column part 7 and the second column part 8 together form a tension resistant connection. The first column part 7 is associated in this instance with the lower shell and the second column part 8 is associated with the upper shell 3. However, this could also be reversed. The shells 2, 3 and the column parts 7, 8 preferably are composed of plastic material, but could also be composed of other materials.

Figure 3:
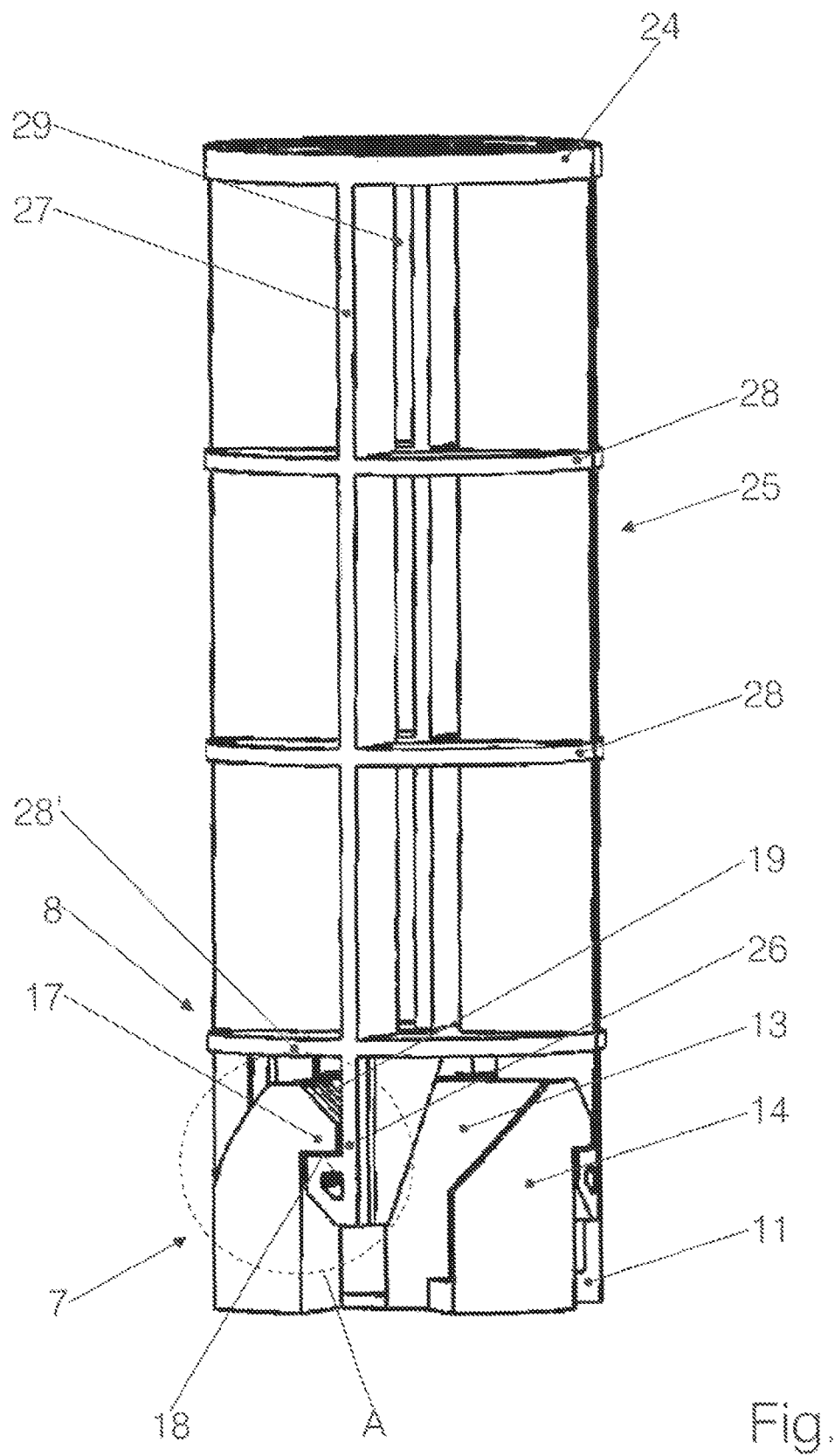
FIG. 3 illustrates an axonometric view of a column, in accordance with the invention.
Figure 4:
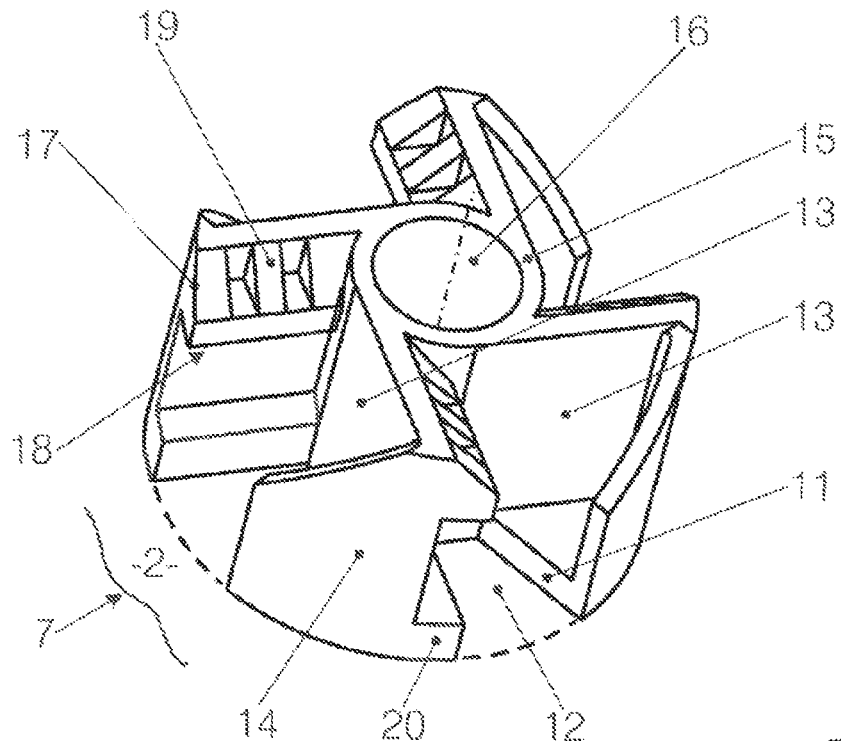
FIG. 4 illustrates an axonometric view of the first part of the column.

As illustrated in FIGS. 3 and 4, the first column part 7 and the second column part 8 of the basically cylindrical column 6 are illustrated in the assembled state of the container (as in FIG. 2). As illustrated in FIG. 4, the first column part 7 includes a flange 11, in this case with cut-out sectors 12, of (in this case) four vertical webs 13 having cylindrical supporting walls 14, and of a hollow cylinder 15 which forms a centering bore 16. The webs 13 transition tangentially into the hollow cylinder 15. The webs 13 form catches 17 at their ends remote from the shell 2. The catches 17 have a latching surface 18 facing their shell 2 and a deflecting surface 19 remote from their shell. A stop 20 is either part of the flange 11 or is molded integrally on the web 13 at a corresponding height on the side of the latching surfaces.

Figure 5:
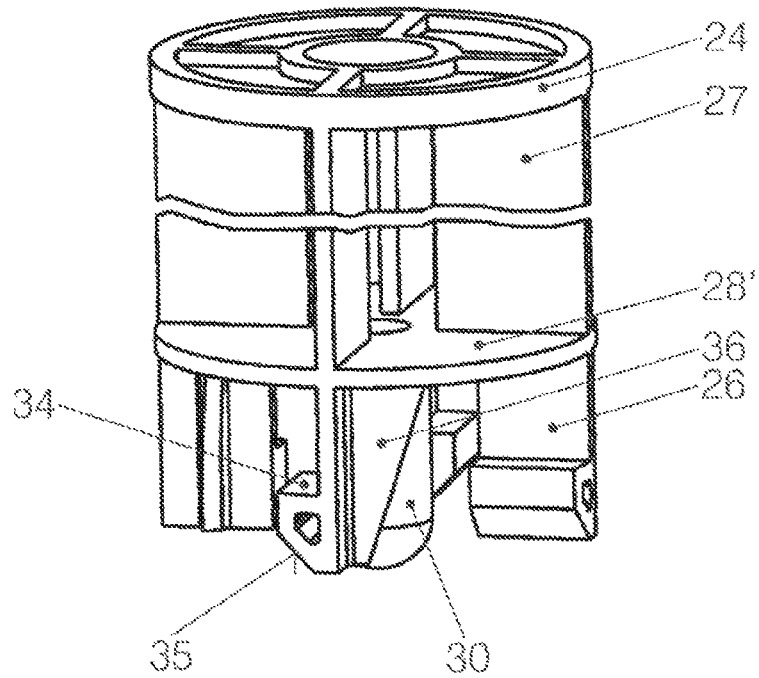
FIG. 5 illustrates an axonometric view of the second part of the column.

As illustrated in FIGS. 4 and 5, the second column part 8 includes a flange 24 of a formed body 25 of considerable length connected thereto, of (likewise) four latching hooks 26 and of a centering mandrel 30. The formed body 25 includes four ribs 27 extending in the longitudinal direction and of a number of diaphragms 28 normal to the axis. The ribs 27 do not reach as far as the axis of the column 6 and leave free a central chamber 29. The ribs 27 transition into the latching hooks 26 on the side remote from the welding flange 24. As can be seen from the arrangement and orientation of the ribs, the formed body 25 is torsionally resilient.

Figure 6:
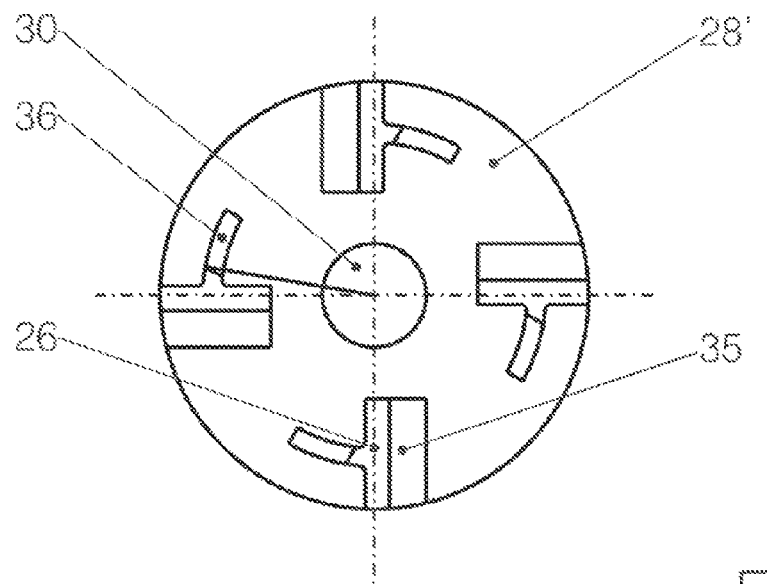
FIG. 6 illustrates a view of the second part from the first part.

As illustrated in FIG. 5 and FIG. 6, that end of the second column part 8 of the column 6 which is remote from the shell 3 is broken off and illustrated in detail. The centering mandrel 30 connects to the diaphragm 28'. It fits into the centering bore 16 of the first column part 7. The longitudinal ribs 27 transition into the latching hooks 26 after crossing the diaphragm 28. The latching hooks 26 each form a latching surface 34 and a deflecting surface 35. The latching surface 34 faces the welding flange 24 and the deflecting surface 35 is remote from the welding flange 24. In this case, the latching hooks 26 have triangular bracings 36 on their backs, because the resilient displacement of the latching hooks 26 occurs in this instance by torsion of the formed body 25. However, it is also possible to form only the latching hooks 26 downstream from the diaphragm 28' in a resilient manner. The bracings 36 are then omitted.

Figure 7:
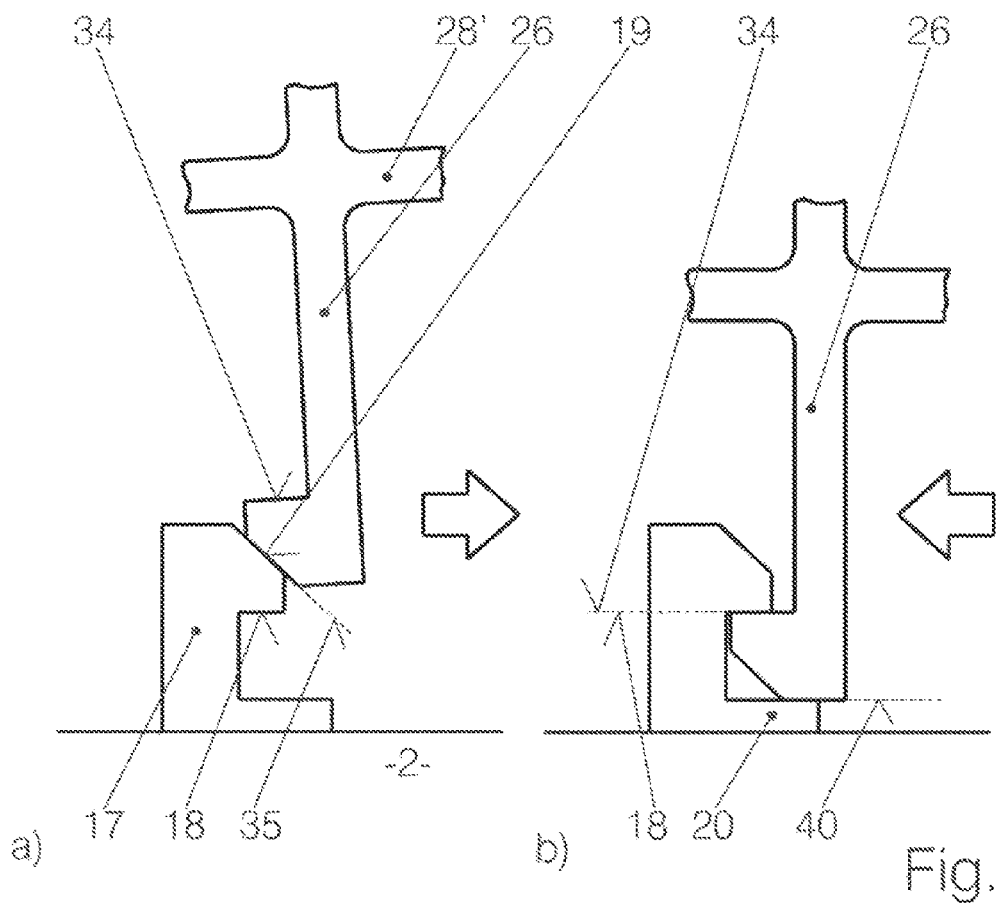
FIG. 7 illustrates A of FIG. 3.

As illustrated in FIG. 7, two stages of the assembly of the two shells 2, 3 and of the conjoining of the two column parts 7, 8 of the column 6 can be seen.

As illustrated in FIG. 7(a), during the joining process, the deflecting surface 35 of the latching hook 26 slides over the deflecting surface 19 of the catch 17. In the process, the second column part 8 is twisted or otherwise manipulated over its entire length.

As illustrated in FIG. 7(b), once the two shells 2, 3 have reached the final joined position, the latching hook 26 snaps back resiliently into its starting position so that the two latching surfaces 18, 34 rest against one another and an end face 40 of the latching hook 26 almost contacts the stop 20. Because the latching surfaces 18, 34 lie in a plane normal to the axis of the column 6, a tension resistant and positive connection between the two column parts 7, 8 of the column 6 is thus produced. The outer flanges 4, 5 of the two shells 2, 3 can now also be welded together.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A fuel container comprising:
a first shell;
a second shell;
a first column body with a first end on an inner surface of the first shell and a second end, the first column body including:
a flange with a plurality of cut-out sectors at the second end and a plurality of webs which form a plurality of catches; and
a second column body with a first end on the inner surface of the second shell and a second end configured to permit a first interconnection with the second end of the first column body, the second column body including:
a plurality of spaced apart diaphragms arranged in a plane normal to a longitudinal axis of the second column body; and
a plurality of spaced apart ribs each arranged in a plane parallel to the longitudinal axis of the second column body and which cross the diaphragms to transition into a latching hook at the second end of the second column body, each latching hook configured to engage a corresponding catch.

2. The fuel container of claim 1, wherein each shell has a peripheral flange respectively configured to permit a second interconnection of the shells.

3. The fuel container of claim 1, wherein the catches have a latching surface facing the first shell and a deflecting surface remote from the first shell.

4. The fuel container of claim 3, wherein the web further includes a stop which corresponds to a height on the side of the latching surfaces.

5. The fuel container of claim 1, wherein the latching hooks have stop surfaces which, once the latching hooks engaged the catches, prevent the first column body and the second column body from moving closer to one another.

6. The fuel container of claim 1, wherein the latching hooks are resiliently displaceable.

7. The fuel container of claim 1, wherein the latching hooks are resiliently flexible.

8. The fuel container of claim 1, wherein the second column body is torsionally flexible and configured to enable resilient displacement of the latching hooks in a plane normal to the longitudinal axis of the second column body.

9. The fuel container of claim 1, wherein each latching hook form a latching surface and a deflecting surface.

10. The fuel container of claim 1, wherein:
the first column body includes a hollow cylinder at the second end which forms a centering bore; and
the second column body includes a centering mandrel at the second end of the second column body which is configured for receipt into the centering bore.

11. The fuel container of claim 10, wherein the webs transition tangentially into the hollow cylinder.

12. A fuel container comprising:
a fuel container body having a first fuel container body section and a second fuel container body section; and
a column extending between the first fuel container body section and the second fuel container body section, the column including:
a first column body with a first end configured for connection to an inner surface of the first fuel container body section, and a second end having a flange with a plurality of cut-out sectors at the second end, a plurality of webs at the second end and which have supporting walls which form catches; and
a second column body with a first end configured for connection to an inner surface of the second fuel container body section and a second end, the second column body having a plurality of spaced apart diaphragms, and a plurality of spaced apart ribs which terminate into a latching hook at the second end of the second column body and which are configured to engage a corresponding catch.

13. The fuel container of claim 12, wherein:
the first column body includes a hollow cylinder at the second end which forms a centering bore;
the second column body includes a centering mandrel at the second end of the second column body which is configured for receipt in the centering bore; and
the webs transition tangentially into the hollow cylinder.

14. The fuel container of claim 12, wherein the catches have a latching surface facing the first fuel container body section and a deflecting surface remote from the first fuel container body section.

15. The fuel container of claim 14, wherein the web further includes a stop which corresponds to a height on the side of the latching surfaces.

16. The fuel container of claim 12, wherein the latching hooks have stop surfaces which, once the latching hooks engaged the catches, prevent the first column body and the second column body from moving closer to one another.

17. The fuel container of claim 12, wherein the latching hooks are resiliently displaceable.

18. The fuel container of claim 12, wherein the latching hooks are resiliently flexible.

19. The fuel container of claim 12, wherein the second column body is torsionally flexible and configured to enable resilient displacement of the latching hooks in a plane normal to a longitudinal axis of the column.

20. A fuel container comprising:
a first fuel container body having a first column body including:
a plurality of webs at a distal end which have supporting walls which form catches and which transition tangentially into a centering bore; and
a second fuel container body having a second column body configured for connection to the first fuel container body, the second column body including:
a plurality of spaced apart ribs extending in a direction parallel to a longitudinal axis of the second column body and which terminate into latching hooks configured to engage a corresponding catch; and
a centering mandrel configured for receipt in the centering bore.

* * * * *